United States Patent
Dinu et al.

(10) Patent No.: US 8,377,387 B2
(45) Date of Patent: Feb. 19, 2013

(54) FLUIDIZATION DEVICE FOR SOLID FUEL PARTICLES

(75) Inventors: Constantin Dinu, Katy, TX (US); Steven Craig Russell, Houston, TX (US); Yichuan Fang, Houston, TX (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 12/822,132

(22) Filed: Jun. 23, 2010

(65) Prior Publication Data
US 2011/0318234 A1    Dec. 29, 2011

(51) Int. Cl.
*B01J 8/08* (2006.01)
*F27B 15/08* (2006.01)

(52) U.S. Cl. ........ 422/232; 422/139; 422/145; 422/129; 406/86; 406/92; 406/93; 100/101 CF; 48/77

(58) Field of Classification Search ................ 422/139, 422/145, 129, 232; 406/86, 92, 93; 110/101 CF; 48/77
See application file for complete search history.

(56) References Cited

U.S. PATENT DOCUMENTS

| | | | |
|---|---|---|---|
| 4,183,702 A | 1/1980 | Bonnel | |
| 4,278,367 A | 7/1981 | Jacobson | |
| RE31,572 E | 5/1984 | Coulter et al. | |
| 4,466,082 A | 8/1984 | Zoschak et al. | |
| 4,482,275 A | 11/1984 | Shinozaki et al. | |
| 4,501,518 A | 2/1985 | Smith | |
| 4,529,336 A | 7/1985 | Shinozaki et al. | |
| 4,758,117 A | 7/1988 | Maki et al. | |
| 4,805,562 A * | 2/1989 | Davis et al. | 122/7 R |
| 4,834,588 A | 5/1989 | Salter et al. | |
| 4,978,441 A | 12/1990 | Buchanan et al. | |
| 5,127,772 A | 7/1992 | Dewitz | |
| 5,129,766 A * | 7/1992 | Dirkse et al. | 406/136 |
| 5,132,917 A | 7/1992 | Bass | |
| 5,205,992 A * | 4/1993 | van Ommen et al. | 422/140 |
| 5,285,735 A | 2/1994 | Motoi et al. | |
| 5,395,597 A | 3/1995 | Buchanan et al. | |
| 5,705,130 A * | 1/1998 | Hedrick | 422/145 |
| 6,007,234 A | 12/1999 | Steele | |
| 6,170,976 B1 | 1/2001 | Sisk | |
| 6,609,871 B2 | 8/2003 | Pfeiffer et al. | |
| 7,144,204 B2 | 12/2006 | Hilgraf | |

FOREIGN PATENT DOCUMENTS

EP    0454230    10/1991

OTHER PUBLICATIONS

TM-DFS-309 Feeder Design Literature Review. http://catalog.conveyorspneumatic.com/viewitems/side-discharge-2/fuller-kinyon-m-pump-parts.

* cited by examiner

Primary Examiner — Walter D Griffin
Assistant Examiner — Lessanework Seifu
(74) Attorney, Agent, or Firm — Fletcher Yoder P.C.

(57) ABSTRACT

A system includes a fluidization device including a flow passage configured to convey a flow of solid fuel particles in a downstream direction, and a body disposed within the flow passage. The body is configured to direct the flow of solid fuel particles between the body and an outer wall of the flow passage. The fluidization device also includes a carrier gas injection port positioned radially outward from the body. The carrier gas injection port is configured to provide a flow of carrier gas in the downstream direction to break up agglomerations within the flow of solid fuel particles.

27 Claims, 7 Drawing Sheets

FLUIDIZATION DEVICE FOR SOLID FUEL PARTICLES

BACKGROUND OF THE INVENTION

The subject matter disclosed herein relates to a fluidization device for solid fuel particles.

Gasifiers convert carbonaceous materials into a mixture of carbon monoxide and hydrogen, referred to as synthesis gas or syngas. For example, a power plant may include one or more gasifiers that react a feedstock at a high temperature with oxygen and/or steam to produce syngas, which may be treated prior to use as a fuel. As will be appreciated, providing the gasifier with a substantially uniform and homogeneous distribution of feedstock particles enhances efficiency of the syngas conversion process. Unfortunately, conveying the feedstock particles to the gasifier under high pressure induces the formation of agglomerations that may decrease gasifier efficiency.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fluidization device including a flow passage configured to convey a flow of solid fuel particles in a downstream direction, and a body disposed within the flow passage. The body is configured to direct the flow of solid fuel particles between the body and an outer wall of the flow passage. The fluidization device also includes a carrier gas injection port positioned radially outward from the body. The carrier gas injection port is configured to provide a flow of carrier gas in the downstream direction to break up agglomerations within the flow of solid fuel particles.

In a second embodiment, a system includes a fluidization device including a flow passage configured to convey a flow of solid particles in a downstream direction toward a gasifier, and a body disposed within the flow passage. The body is configured to direct the flow of solid particles between the body and an outer wall of the flow passage. The fluidization device also includes a trim gas injection port configured to provide a flow of trim gas in an upstream direction to enhance homogeneity of particle distribution within the flow of solid particles.

In a third embodiment, a system includes a fluidization device including a flow passage configured to convey a flow of solid fuel particles in a downstream direction, and a body disposed within the flow passage. The body is configured to direct the flow of solid fuel particles between the body and an outer wall of the flow passage. The fluidization device also includes multiple splitter vanes disposed within the flow passage and configured to enhance fragmentation within the flow of solid fuel particles and/or multiple swirler vanes disposed within the flow passage and configured to establish a recirculating or swirling flow of solid fuel particles.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure include a fluidization device configured to establish a substantially uniform and homogeneous flow of solid particles from a pressurization device to a gasifier, while substantially reducing or eliminating buildup of solids within the fluidization device. In certain embodiments, the fluidization device includes a flow passage configured to convey a flow of solid particles in a downstream direction, and a body disposed within the flow passage. The body is configured to direct the flow of solid particles between the body and an outer wall of the flow passage. The fluidization device also includes a carrier gas injection port configured to provide a flow of carrier gas in the downstream direction to break up agglomerations within the flow of solid particles and to carry the solid particles downstream to the gasifier. Further embodiments of the fluidization device include a trim gas injection port configured to provide a flow of trim gas in an upstream direction to enhance homogeneity of particle distribution within the flow of solid particles. Yet further embodiments of the fluidization device include multiple splitter vanes disposed within the flow passage and configured to enhance fragmentation within the flow of solid particles and/or multiple swirler vanes disposed within the flow passage and configured to establish a recirculating or swirling flow of solid particles. Still further embodiments of the fluidization device include a buffer gas injection port configured to inject buffer gas to provide a buffer boundary layer between the flow of solid fuel particles and the outer wall of the flow passage. In certain embodiments, a flow rate of carrier gas through the carrier gas injection port, a flow rate of trim gas through the trim gas injection port, a shape of the body, an angle of each splitter vane relative to the flow of solid particles and/or an angle of each swirler vane relative to the flow of solid particles is adjustable. By utilizing these mechanical and fluid-dynamic features, the fluidization device may break up agglomerations within the flow of solid particles, thereby providing the gasifier with a substantially uniform and homogeneous distribution of feedstock particles which may enhance efficiency of the syngas conversion process, and improve the availability of the solids transport system and gasifier. For example, the transport system may be less likely to experience downtime caused by agglomerated solids plugging the flow passage, and the gasifier may be less likely to experience temperature excursions that reduce the useful life of refractory lined walls or water walls.

Figure 1:
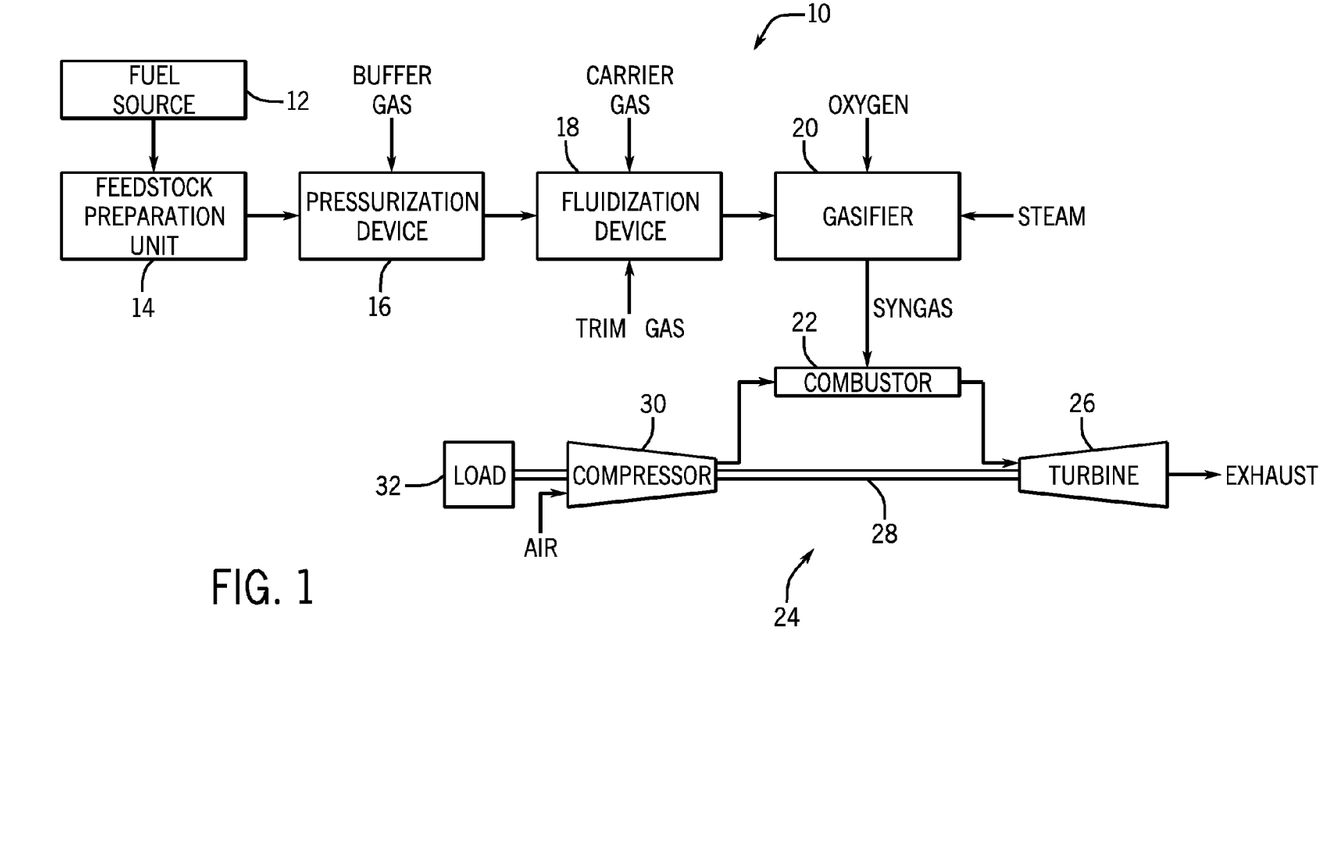
FIG. 1 is a block diagram of an exemplary power generation system including a gasifier configured to provide syngas to a combustor in accordance with certain embodiments of the present technique.

FIG. 1 is a block diagram of an exemplary power generation system 10 including a gasifier configured to provide syngas to a combustor. The illustrated power generation system 10 may be part of an integrated gasification combined cycle (IGCC) system that may produce and burn a synthetic gas, i.e., syngas. Elements of the system 10 include a fuel source 12, such as a solid feed, that may be utilized as a source of energy for the system 10. The fuel source 12 may include coal, petroleum coke, biomass, wood-based materials, agricultural wastes, tars, coke oven gas, and asphalt, or other carbon containing items.

The solid fuel of the fuel source 12 may be passed to a feedstock preparation unit 14. The feedstock preparation unit 14 may, for example, resize or reshape the fuel source 12 by chopping, milling, shredding, pulverizing, briquetting, or palletizing the fuel source 12 to generate feedstock. In the present embodiment, the fuel source 12 is dry coal, and the feedstock preparation unit 14 is configured to provide solid particles of dry coal for processing by the gasifier.

The feedstock prepared by the feedstock preparation unit 14 may be passed to a pressurization device 16. In certain embodiments, the pressurization device 16 is a posimetric solids pump configured to output solid feedstock (e.g., dry coal) particles at a pressure of more than approximately 800 PSIG. As illustrated, the pressurization device 16 is configured to receive a flow of buffer gas. The buffer gas (e.g., nitrogen, carbon dioxide, steam, etc.) is configured to provide a buffer between the solid particles and the pressurization device 16, thereby protecting the surfaces of the pressurization device 16 from corrosion and/or wear, and ensuring that the carrier gas travels downstream toward the gasifier instead of upstream through the pressurization device. The high pressure solid particles then flow to a fluidization device 18. As discussed in detail below, the fluidization device 18 is configured to inject gas into the flow of solid particles to facilitate movement of the particles in a downstream direction. The fluidization device 18 is also configured to break up agglomerations within the flow of solid particles, thereby providing the gasifier 20 with a substantially uniform and homogeneous distribution of feedstock particles which may enhance efficiency of the syngas conversion process.

Certain power generation systems employ a lock hopper to transfer feedstock from the feedstock preparation unit to the gasifier. In such configurations, the lock hopper is filled with feedstock at atmospheric pressure and then sealed. The feedstock is then transferred to a high pressure conveyance line that transports the feedstock toward the gasifier. In this manner, the feedstock may be transferred to the conveyance line without substantial fluid leakage. Unfortunately, because the lock hopper is loaded with feedstock before the transfer process is initiated, feedstock is delivered to the gasifier in a periodic manner, thereby decreasing efficiency of the syngas conversion process. Multiple lock hopper systems, such as those consisting of three vessels, reduce the effect but solids stratification and solids flow variation may still exist. Because the present embodiments employ a pressurization device 16 (e.g., posimetric solids pump) and a fluidization device 18 to pressurize and break up the feedstock into a substantially uniform and homogeneous flow, the gasifier 20 is provided with a substantially continuous supply of feedstock. Consequently, the lock hopper is obviated and the efficiency of the gasifier 20 may be enhanced.

The gasifier 20 may convert the feedstock (e.g., dry coal particles) into syngas, e.g., a combination of carbon monoxide and hydrogen. This conversion may be accomplished by subjecting the feedstock to a controlled amount of any moderator and oxygen at elevated pressures (e.g., from approximately 600 PSIG-1200 PSIG) and temperatures (e.g., approximately 2200° F.-2700° F.), depending on the type of gasifier utilized. The heating of the feedstock during a pyrolysis process may generate a solid (e.g., char) and residue gases (e.g., carbon monoxide, hydrogen, and nitrogen). The char remaining from the feedstock from the pyrolysis process may only weigh up to approximately 30% of the weight of the original feedstock.

The combustion reaction in the gasifier 20 may include introducing oxygen to the char and residue gases. The char and residue gases may react with the oxygen to form carbon dioxide and carbon monoxide, which provides heat for the subsequent gasification reactions. The temperatures during the combustion process may range from approximately 2200° F. to approximately 2700° F. In addition, steam may be introduced into the gasifier 20. The gasifier 20 utilizes steam and limited oxygen to allow some of the feedstock to be burned to produce carbon monoxide and energy, which may drive a second reaction that converts further feedstock to hydrogen and additional carbon dioxide.

In this way, a resultant gas may be manufactured by the gasifier 20. The resultant gas may include approximately 85% of carbon monoxide and hydrogen, as well as $CH_4$, HCl, HF, COS, $NH_3$, HCN, and $H_2S$ (based on the sulfur content of the feedstock). This resultant gas may be termed "raw syngas." The gasifier 20 may also generate waste, such as a slag, which may be a wet ash material.

In certain embodiments, a gas cleaning unit may be utilized to clean the raw syngas. The gas cleaning unit may scrub the raw syngas to remove the HCl, HF, COS, HCN, and $H_2S$ from the raw syngas, which may include the separation of $H_2S$ by an acid gas removal process. Elemental sulfur may by recovered by a sulfur recovery unit from the $H_2S$. Furthermore, the gas cleaning unit may separate salts from the raw syngas via a water treatment unit, which may utilize water purification techniques to generate usable salts from the raw syngas. Subsequently, a clean syngas may be generated from the gas cleaning unit. This clean syngas may be directed into a combustor 22 (e.g., a combustion chamber) of a gas turbine engine 24 as combustible fuel.

The gas turbine engine 24 includes a turbine 26, a drive shaft 28, and a compressor 30, as well as the combustor 22. The combustor 22 receives fuel, such as the syngas, which may be injected under pressure from fuel nozzles. This fuel is mixed with compressed air and combusted within the combustor 22. This combustion creates hot pressurized exhaust gases. The combustor 22 directs the exhaust gases towards an exhaust outlet of the turbine 26. As the exhaust gases from the combustor 22 pass through the turbine 26, the exhaust gases force turbine blades in the turbine 26 to rotate the drive shaft 28 along an axis of the gas turbine engine 24. As illustrated, the drive shaft 28 may be connected to various components of the gas turbine engine 24, including the compressor 30.

The drive shaft 28 connects the turbine 26 to the compressor 30 to form a rotor. The compressor 30 includes blades coupled to the drive shaft 28. Thus, rotation of turbine blades in the turbine 26 causes the drive shaft 28 connecting the turbine 26 to the compressor 30 to rotate blades within the compressor 30. The rotation of blades in the compressor 30 causes the compressor 30 to compress air received via an air intake in the compressor 30. The compressed air is then fed to the combustor 22 and mixed with fuel to allow for higher efficiency combustion. The drive shaft 28 may also be connected to a load 32, which may be a stationary load, such as an electrical generator, for producing electrical power in a power plant. Indeed, the load 32 may be any suitable device that is powered by the rotational output of the gas turbine engine 24.

Figure 2:
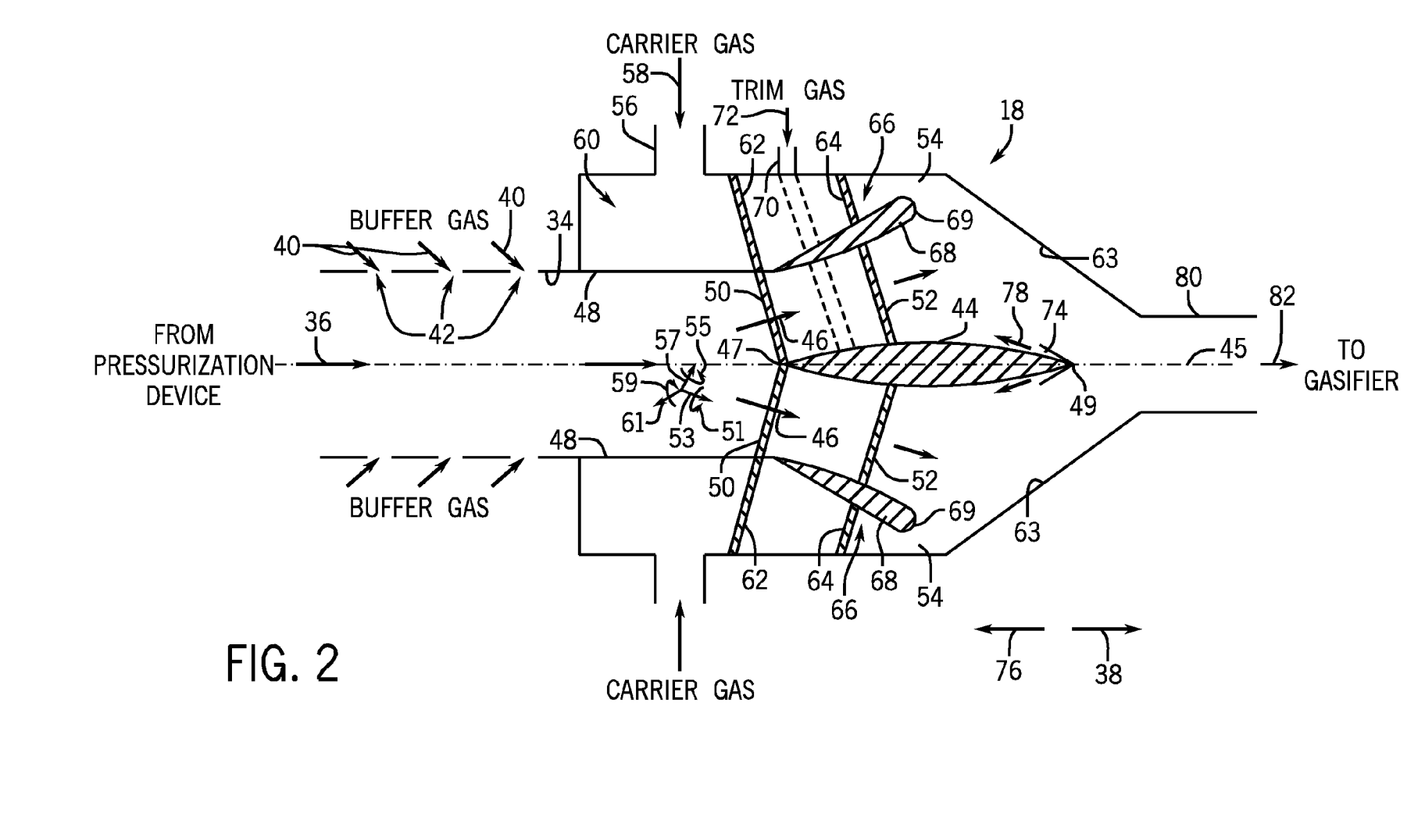
FIG. 2 is a schematic diagram of an embodiment of a fluidization device configured to enhance fragmentation of solid fuel particles in accordance with certain embodiments of the present technique.

FIG. 2 is a schematic diagram of an embodiment of a fluidization device 18 configured to enhance fragmentation of solid fuel particles. As illustrated, the fluidization device 18 includes a flow passage 34 configured to convey a flow of solid particles 36 in a downstream direction 38. As previously discussed, the solid particles 36 may include dry fuel/feedstock solids, such as coal, that may be converted into syngas within the gasifier 20. The fluidization device 18 is configured to break up agglomerations within the solid particles and provide a substantially homogeneous distribution of particles to the gasifier 20. As will be appreciated, a substantially even distribution of dry fuel solids may increase the efficiency of the syngas conversion process, and improve the availability of the solids transport system and gasifier. For example, the transport system may be less likely to experience downtime caused by agglomerated solids plugging the flow passage, and the gasifier may be less likely to experience temperature excursions that reduce the useful life of refractory lined walls or water walls.

In the present embodiment, buffer gas 40 is injected through buffer gas inlets 42 positioned along the flow passage 34. The buffer gas 40 may provide a buffer boundary layer between the flow of solid particles 36 and an outer wall 48 of the flow passage 34, thereby ensuring that the solid particles 36 do not collect on the outer wall 48. In addition, certain solid particles and/or gases injected into the pressurization device may be corrosive. Consequently, the buffer gas 40 may serve to protect the inner surface of the flow passage 34 from the effects of the corrosive particles and/or gases, thereby increasing the longevity of the fluidization device 18 and the pressurization device 16 (e.g., posimetric solids pump).

The illustrated fluidization device 18 includes a body 44 disposed within the flow passage 34. The body 44 is configured to split the flow of solid particles 36 into multiple flow streams 46 and to direct each stream 46 between the body 44 and the outer wall 48 of the flow passage 34. As illustrated, the body 44 includes a tapered leading edge 47 and a tapered trailing edge 49. As will be appreciated, the tapered leading and trailing edges 47 and 49 facilitate a substantially continuous flow of solid particles 36 around the body 44. By directing the streams 46 of solid particles 36 between the body 44 and the outer wall 48, the body 44 serves to break up agglomerations within the solid particle flow. In the present embodiment, the flow passage 34 has a substantially circular cross section and the body 44 is positioned at the approximate radial center of the flow passage 34. In this configuration, each stream 46 will pass through a region having a substantially equal cross-section. However, it should be appreciated that the body 44 may be positioned closer to one side of the outer wall 48, thereby establishing flow passages having varying cross-sections. Furthermore, the illustrated body 44 is axi-symmetric with respect to the longitudinal axis 45 of the flow passage 34, i.e., the body 44 includes a substantially circular radial profile centered about the longitudinal axis 45. However, it should be appreciated that alternative embodiments of the body 44 may employ other radial profiles.

As illustrated, the body 44 is supported by first struts or splitter vanes 50 and second struts or swirler vanes 52. As discussed in detail below, multiple first struts or splitter vanes 50 and/or multiple second struts or swirler vanes 52 may be circumferentially spaced about the body 44. In certain embodiments, the splitter vanes 50 are configured to enhance fragmentation within the flow of solid particles 36. In alternative embodiments, the first struts 50 support the body 44, but have substantially no impact on fragmentation. As discussed in detail below, the configuration of the splitter vanes 50 may be particularly configured to provide a desired degree of fragmentation based on the particular solid particles 36 passing through the fluidization device 18 (e.g., fuel type, particle size, particle moisture content, etc.) and/or the configuration of the gasifier 20. In certain embodiments, the splitter vanes 50 may be interchangeable to provide the desired degree of fragmentation.

In further embodiments, the angle of the splitter vanes 50 relative to the flow of solid particles 36 is adjustable. For example, an actuator may be coupled to the vanes 50 and configured to rotate each vane 50 based on a desired degree of fragmentation. For example, the splitter vanes 50 may be aligned with the flow of solid particles 36 if a smaller degree of fragmentation is desired, or rotated such that the solid particles 36 impact a portion of the body of each vane for a larger degree of fragmentation. In certain embodiments, the splitter vanes 50 may be configured to rotate a first angle 51 about an axis 53 substantially parallel to the flow of solid particles 36, a second angle 55 about a radial axis 57 of the vanes 50 and/or a third angle 59 about a circumferential axis 61 of the vanes 50. In alternative embodiments, the angle of each spiller vane 50 may be fixed.

As discussed in detail below, the swirler vanes 52 may be configured to establish a recirculating and/or swirling flow of solid particles 36. In alternative embodiments, the second struts 52 support the body 44, but have substantially no impact on the flow of solid particles 36. As will be appreciated, the recirculating and/or swirling flow of solid particles 36 may enhance the homogeneity of particle distribution, thereby increasing gasifier efficiency. In certain embodiments, the swirler vanes 52 may be interchangeable to provide a desired degree of recirculation and/or swirl.

Similar to the splitter vanes 50, certain embodiments of the fluidization device 18 may provide adjustable swirler vanes 52. For example, an actuator may alter an angle of each swirler vane 52 relative to the flow of solid particles 36 to establish varying degrees of recirculation and/or swirl. For example, the swirler vanes 52 may be aligned with the flow of solid particles 36 if a smaller degree of recirculation and/or swirl is desired, or rotated to direct the flow of solid particles 36 in a direction that induces a large degree of recirculation and/or swirl. In this configuration, a desired degree of recirculation and/or swirl may be induced based on the particular solid particles 36 passing through the fluidization device 18 (e.g., fuel type, particle size, particle moisture content, etc.) and/or the configuration of the gasifier 20. In certain embodiments, the swirler vanes 52 may be configured to rotate a first angle 51 about the axis 53 substantially parallel to the flow of solid particles 36, a second angle 55 about the radial axis 57 of the vanes 52 and/or a third angle 59 about the circumferential axis 61 of the vanes 52. In alternative embodiments, the angle of each swirler vane 52 may be fixed.

In the present embodiment, the fluidization device 18 includes a carrier gas injection port 54 positioned radially outward from the body 44. The carrier gas injection port 54 is configured to provide a flow of carrier gas (e.g., nitrogen, carbon dioxide, steam, etc.) in the downstream direction 38 to break up agglomerations within the flow of solid particles 36. The carrier gas also serves to urge the flow of solid particles 36 toward the gasifier 20. As illustrated, the fluidization device 18 includes an inlet 56 configured to receive a flow of carrier gas, as indicated by the arrow 58. The carrier gas passes through a flow path 60 adjacent to the outer wall 48 from the inlet 56 to the injection port 54. By positioning the injection port 54 adjacent to an outer surface 63 of the fluidization device 18, the flow of carrier gas may substantially reduce or eliminate buildup of solid particles 36 along the outer surface 63, thereby decreasing solid particle residence time and enhancing homogeneity of the flow of solid particles 36. In the present embodiment, the flow path 60 includes a second set of first struts or splitter vanes 62 and a second set of second struts or swirler vanes 64. The second set of first struts or splitter vanes 62 supports the first set of struts or splitter vanes 50, and may be configured to alter the flow of carrier gas through the port 60.

The second set of swirler vanes 64 may be configured to establish a recirculating and/or swirling flow of solid particles 36 by directing the flow of carrier gas from the injection port 54. In alternative embodiments, the second set of second struts 64 may have substantially no impact on the flow of carrier gas. As previously discussed, the recirculating and/or swirling flow of solid particles 36 may enhance the homogeneity of particle distribution, thereby increasing gasifier efficiency. Similar to the first set of swirler vanes 52, certain embodiments may provide adjustable swirler vanes 64 within the carrier gas flow path 60. For example, an actuator may alter an angle of each swirler vane 64 relative to the flow of carrier gas to establish varying degrees of recirculation and/or swirl within the flow of solid particles 36. For example, the swirler vanes 64 may be aligned with the flow of carrier gas if a smaller degree of recirculation and/or swirl is desired, or rotated to direct the flow of carrier gas in a direction that induces a larger degree of recirculation and/or swirl. In certain embodiments, the swirler vanes 64 may be configured to rotate a first angle 51 about an axis 53 substantially parallel to the flow of carrier gas, a second angle 55 about a radial axis 57 of the vanes 64 and/or a third angle 59 about a circumferential axis 61 of the vanes 64. In alternative embodiments, the angle of each swirler vane 64 may be fixed.

In the present embodiment, the flow path 60 includes a converging section 66 shaped to decrease the cross-sectional area of the flow path 60 along the downstream direction 38. As will be appreciated, the decrease in cross-sectional area will increase the velocity of carrier gas passing through the injection port 54, thereby providing enhanced mixing between the carrier gas and the flow of solid particles 36. As illustrated, a shroud 68 defines the profile of the converging section 66. Specifically, the shroud 68 is positioned such that the flow of solid particles 36 passes along an inner surface of the shroud 68, the flow of carrier gas passes along an outer surface of the shroud 68, and the carrier gas injection port 54 is formed at a downstream axial end 69 of the shroud 68. In certain embodiments, the axial end 69 of the shroud 68 is shaped to establish a swirling flow of carrier gas from the injection port 54. In further embodiments, the shape of the shroud 68 is adjustable such that the carrier gas may be directed from the injection port 54 to establish a desired flow pattern. In addition, the shroud 68 may be a continuous annular structure, or a series of discrete elements circumferentially disposed about the flow passage 34.

The illustrated embodiment also includes an inlet 70 configured to receive a flow of trim gas, as indicated by the arrow 72. In certain embodiments, the trim gas may be the same type of gas (e.g., nitrogen, carbon dioxide, steam, etc.) as the carrier gas. Alternatively, the trim gas and carrier gas may be different types of gases. As illustrated, the trim gas is directed toward a trim gas injection port 74 positioned downstream from the carrier gas injection port 54. The trim gas injection port 74 is configured to provide a flow of trim gas in an upstream direction 76, as indicated by the arrows 78, to enhance mixing between the flow of carrier gas and the flow of solid particles 36. In the present embodiment, the trim gas injection port 74 is positioned adjacent to a downstream end or trailing edge 49 of the body 44, and is configured to provide the flow of trim gas along a surface of the body 44. By positioning the injection port 74 adjacent to the body 44, the flow of trim gas may substantially reduce or eliminate buildup of solid particles 36 along the surface of the body 44, thereby decreasing solid particle residence time and enhancing homogeneity of the flow of solid particles 36. As discussed in detail below, the flow rate of trim gas through the injection port 74 may be adjustable to vary the interaction between the trim gas and the flow of solid particles 36. In certain embodiments, the flow rate of trim gas from the injection port 74 may be particularly adjusted to establish a swirling and/or a recirculating flow of solid particles 36 within the fluidization device 18. In addition, the trim gas injection port 74 may be a continuous annular structure, or a series of discrete elements circumferentially disposed about the body 44.

As illustrated, the flow of solid particles 36 is directed toward a transfer line 80 that conveys the particles to the gasifier 20, as indicated by the arrow 82. In certain embodiments, the fluidization device 18 may be arranged vertically with the transfer line 80 on top. Such a configuration may facilitate increased mixing between the carrier gas and the flow of solid particles 36, and may enhance the homogeneity of solid particle distribution. However, it should be appreciated that the fluidization device 18 may be arranged horizontally, or vertically with the transfer line 80 at the bottom, in alternative embodiments. Because the fluidization device 18 is configured to break up agglomerations and to provide a substantially uniform flow of solid particles 38 to the gasifier 20, solid particles may be continuously transferred from the pressurization device 16 to the gasifier 20, as compared to the periodic transfers associated with lock hopper operation.

Figure 3:
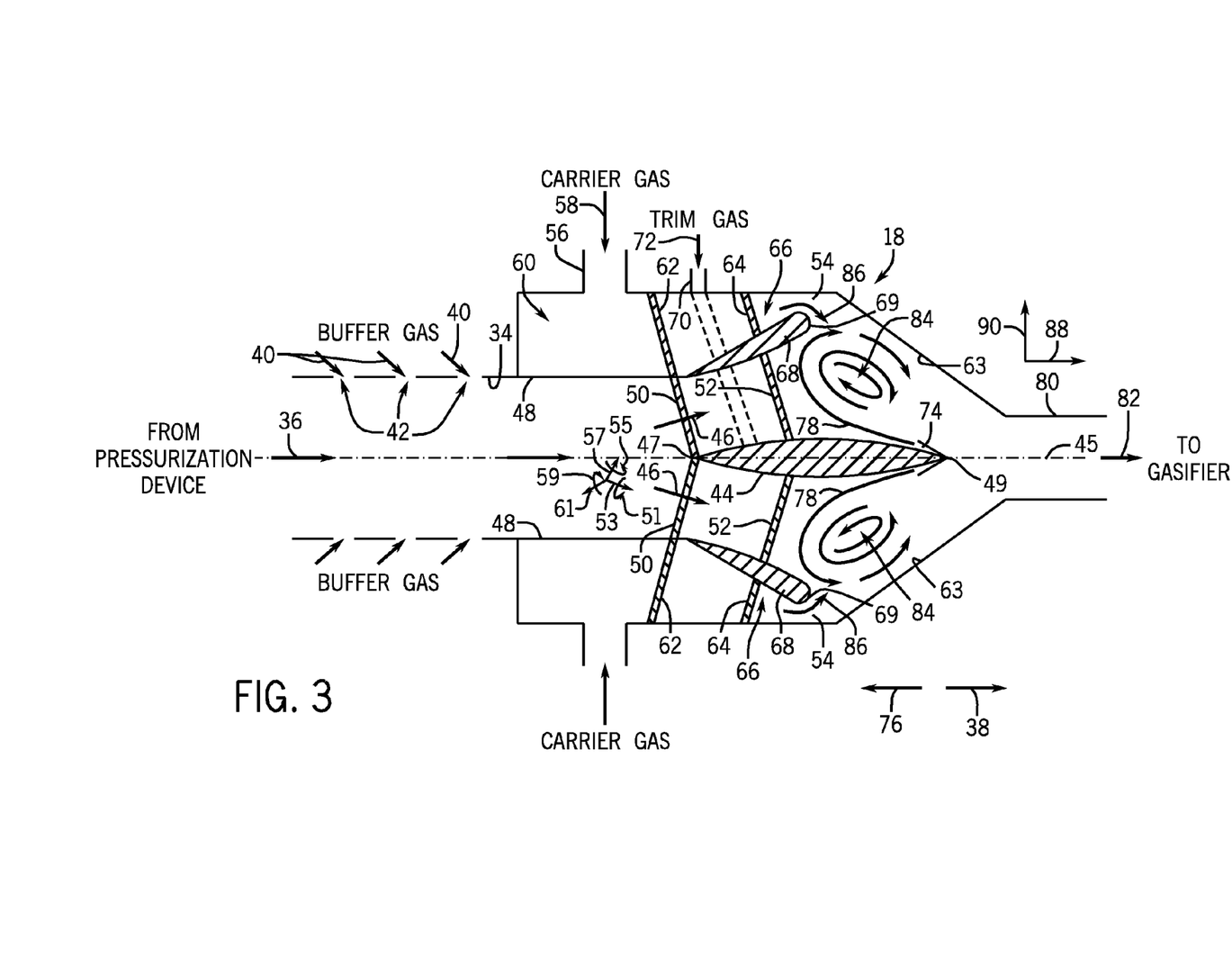
FIG. 3 is a schematic diagram of the fluidization device shown in FIG. 2, illustrating a recirculating flow pattern in accordance with certain embodiments of the present technique.

FIG. 3 is a schematic diagram of the fluidization device 18 shown in FIG. 2, illustrating a recirculating flow pattern. As previously discussed, the velocity of the trim gas expelled from the injection port 74 may be varied to achieve a desired flow pattern within the fluidization device 18. In certain embodiments, trim gas velocity may be particularly selected to establish a recirculating flow 84. Specifically, if the trim gas velocity along the direction 78 is approximately equal to the carrier gas velocity along the direction 86, the illustrated recirculating flow pattern 84 may be established. As illustrated, the recirculating flow 84 induces the solid particles 36 to move is a substantially circular formation along the axial direction 88 and the radial direction 90, thereby enhancing the homogeneity of the particle distribution. In addition, the recirculating flow 84 may decrease particle residence time by reducing particle buildup along the outer surface 63 and/or the surface of the body 44, thereby increasing the continuity of the solid particle flow.

In alternative embodiments, the trim gas velocity may be significantly lower than the velocity of the carrier gas flowing in the direction 86. In such embodiments, a localized recirculation zone or turbulent area may be established adjacent to the body 44, while the remaining carrier gas flows directly toward the transfer line 80. Such a configuration may increase the flow rate of solid particles 36 through the fluidization device 18. However, the localized recirculation zone or turbulent area may provide less mixing between the gases and the solid particles 36, thereby providing decreased uniformity of the solid particles within the flow.

As will be appreciated, the carrier gas velocity and the shape of the shroud 68 may also affect the flow pattern within the fluidization device 18. In certain embodiments, the velocity of carrier gas expelled from the injection port 54 is adjustable. In such embodiments, a higher carrier gas velocity may provide a higher flow rate and decreased particle mixing, while a lower carrier gas velocity may provide a lower flow rate and increased particle mixing. Consequently, the carrier gas flow velocity may be particularly adjusted to achieve a desired particle distribution and flow rate into the gasifier 20. Further embodiments include a movable and/or rotatable shroud 68 configured to alter the flow of carrier gas and/or the flow of solid particles 36 within the fluidization device 18. For example, the shroud 68 may be shaped to direct the carrier gas in the direction 86 and to direct the trim gas in the direction 78 to establish the illustrated recirculating flow. In certain embodiments, the shroud 68 may be shaped to establish the recirculating flow of carrier gas without the use of trim gas. In such embodiments, the trim gas injection ports 74 may be omitted.

Figure 4:
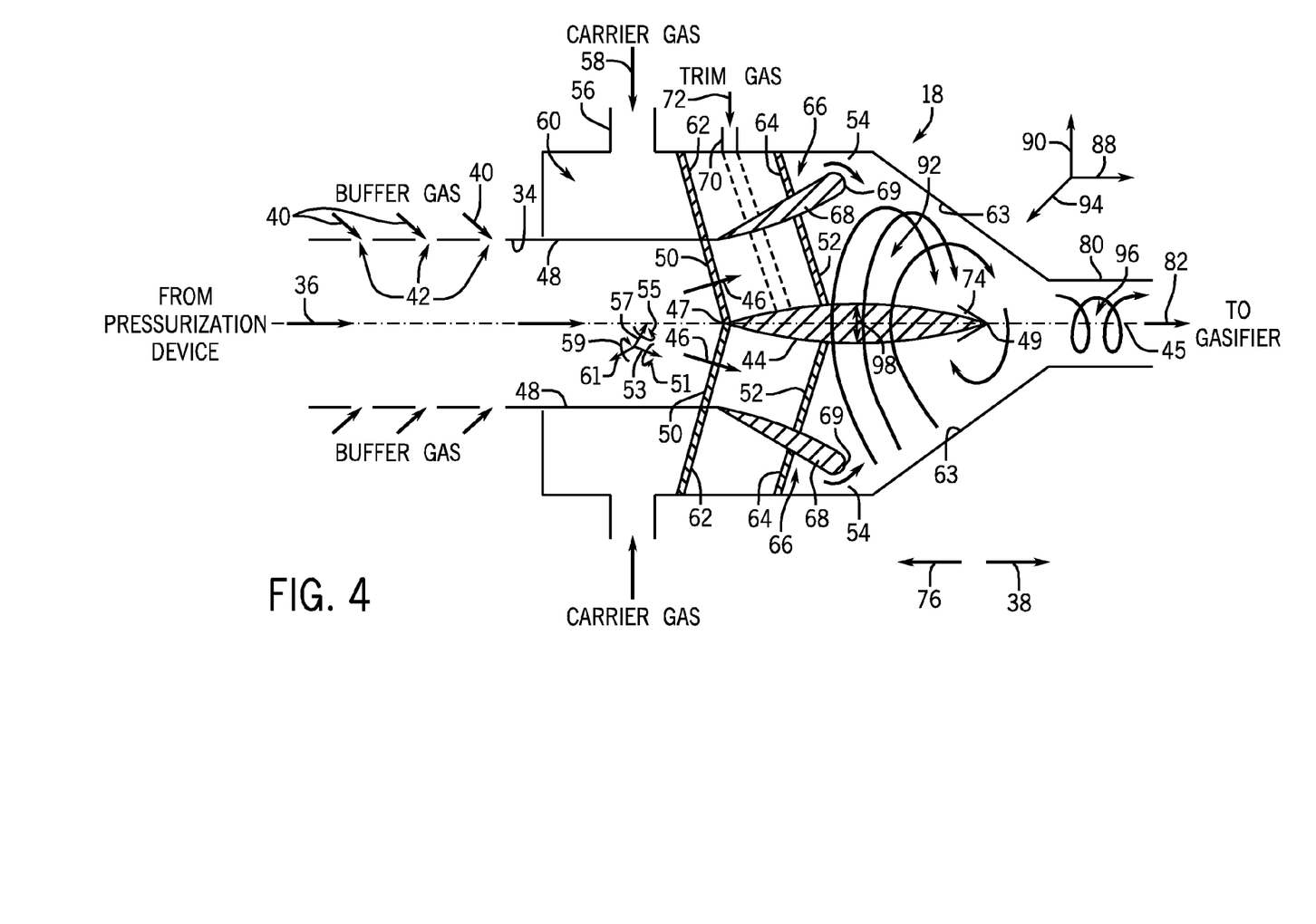
FIG. 4 is a schematic diagram of the fluidization device shown in FIG. 2, illustrating a swirling flow pattern in accordance with certain embodiments of the present technique.

FIG. 4 is a schematic diagram of the fluidization device 18 shown in FIG. 2, illustrating a swirling flow pattern. As previously discussed, an angle of the second set of swirler vanes 64 may be varied to achieve a desired flow pattern within the fluidization device 18. In certain embodiments, the swirler vanes 64 may be particularly angled to establish a swirling flow 92. Specifically, if the swirler vanes 64 are shaped to direct the carrier gas in the circumferential direction 94, the illustrated swirling flow pattern 92 may be established. As illustrated, the swirling flow 92 induces the solid particles 36 to move in a substantially spiral formation along the circumferential direction 94, the axial direction 88 and the radial direction 90, thereby enhancing the homogeneity of the particle distribution. In addition, the swirling flow 92 decreases particle residence time by reducing particle buildup along the outer surface 63 and/or the surface of the body 44, thereby increasing the continuity of the solid particle flow. In the illustrated embodiment, the swirling flow 92 within the fluidization device 18 induces a corresponding swirling flow 96 within the transfer line 80, thereby further increasing the homogeneity of the solid particles 36.

In addition, the shape of the body 44, the shape of the first set of swirler vanes 52 and the shape of the shroud 68 may affect the swirling flow pattern within the fluidization device 18. In certain embodiments, the shape of the body 44 is adjustable. In such embodiments, the shape of the body 44 may be varied to establish the illustrated swirling flow 92. For example, a diameter 98 of the body 44 may be decreased to facilitate establishment of the swirling flow pattern 92. In addition, the body 44 may be movable along the longitudinal axis 45 in both the downstream direction 38 and the upstream direction 76. Positioning the body 44 adjacent to the transfer line 80 may restrict the flow of solid particles 36 through the fluidization device 18. Such a flow restriction may provide back-pressure to the pressurization device 16 during start-up and shut-down conditions, for example. Consequently, the body 44 may be moved along the longitudinal axis 45 to achieve a desired back-pressure to the pressurization device 16 based on flow rate to the gasifier 20.

Further embodiments may include a movable and/or rotatable shroud 68 configured to alter the flow of carrier gas and/or the flow of solid particles 36 within the fluidization device 18. For example, the shroud 68 may be movable and/or rotatable to direct the carrier gas and the flow of solid particles 36 in the circumferential direction 94 to establish the illustrated swirling flow 92. Other embodiments may include an adjustable set of first swirler vanes 52. In such embodiments, the angle of the swirler vanes 52 may be adjusted to establish the illustrated swirling flow 92. In alternative embodiments, the second set of swirler vanes 64 may establish the swirling flow 92 alone, thereby obviating the first set of swirler vanes 52 and/or the shroud 68.

In certain embodiments, the trim gas velocity, the carrier gas velocity, the shape of the body 44, the shape of the shroud 68, the angle of the first set of swirler vanes 52 and the angle of the second set of swirler vanes 64 may be particularly configured to establish both the recirculating flow 84 shown in FIG. 2 and the illustrated swirling flow 92. Such a configuration may further decrease residence time and enhance mixing of gases and solid particles 36. By adjusting the trim gas velocity, the carrier gas velocity, the shape of the body 44, the shape of the shroud 68, the angle of the first set of swirler vanes 52 and the angle of the second set of swirler vanes 64, the flow pattern within the fluidization device 18 may be particularly selected to achieve a desired degree of particle homogeneity and/or a desired flow rate through the fluidization device 18.

Figure 5:
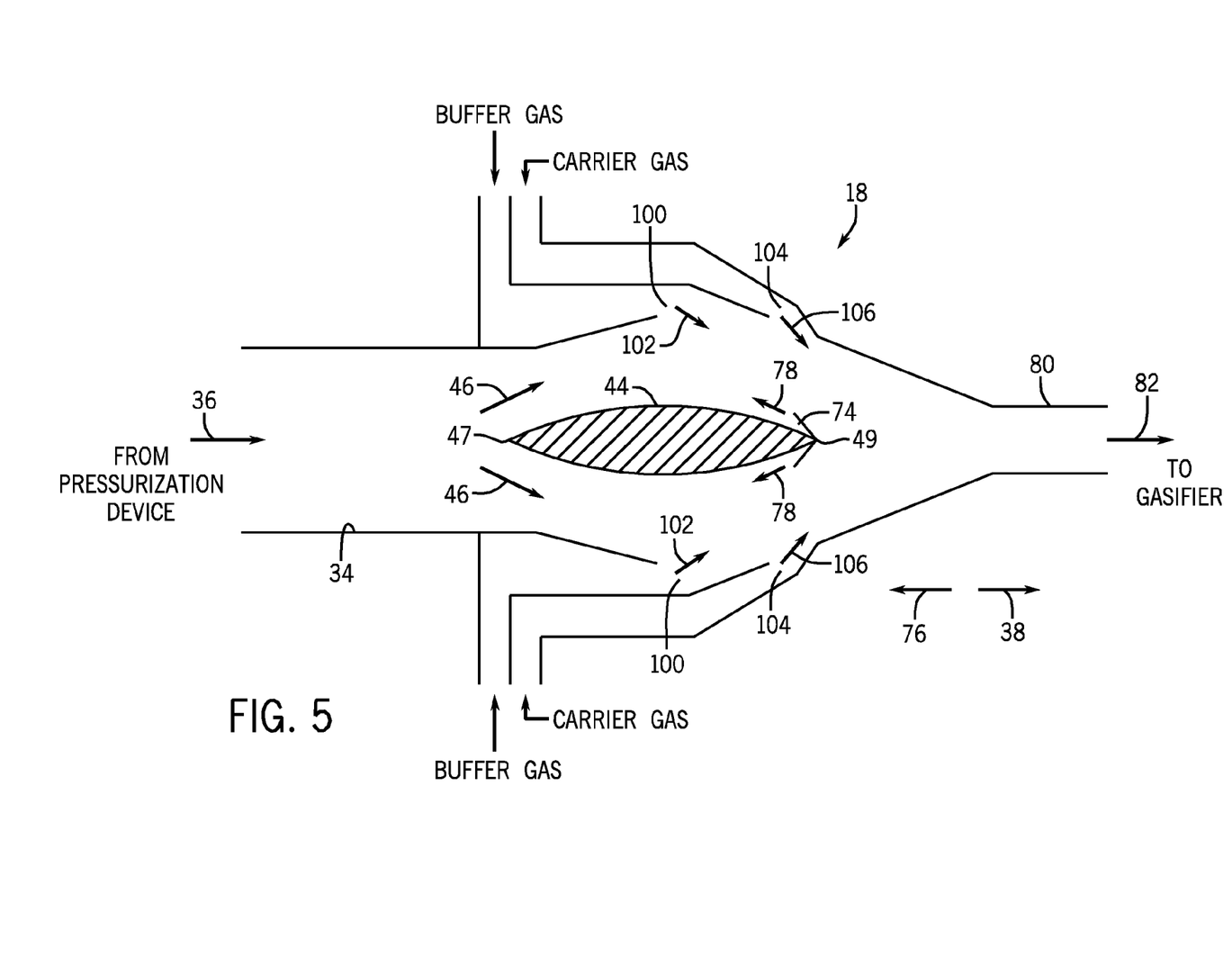
FIG. 5 is a schematic diagram of an alternative embodiment of the fluidization device including downstream carrier gas injection ports.
Figure 6:
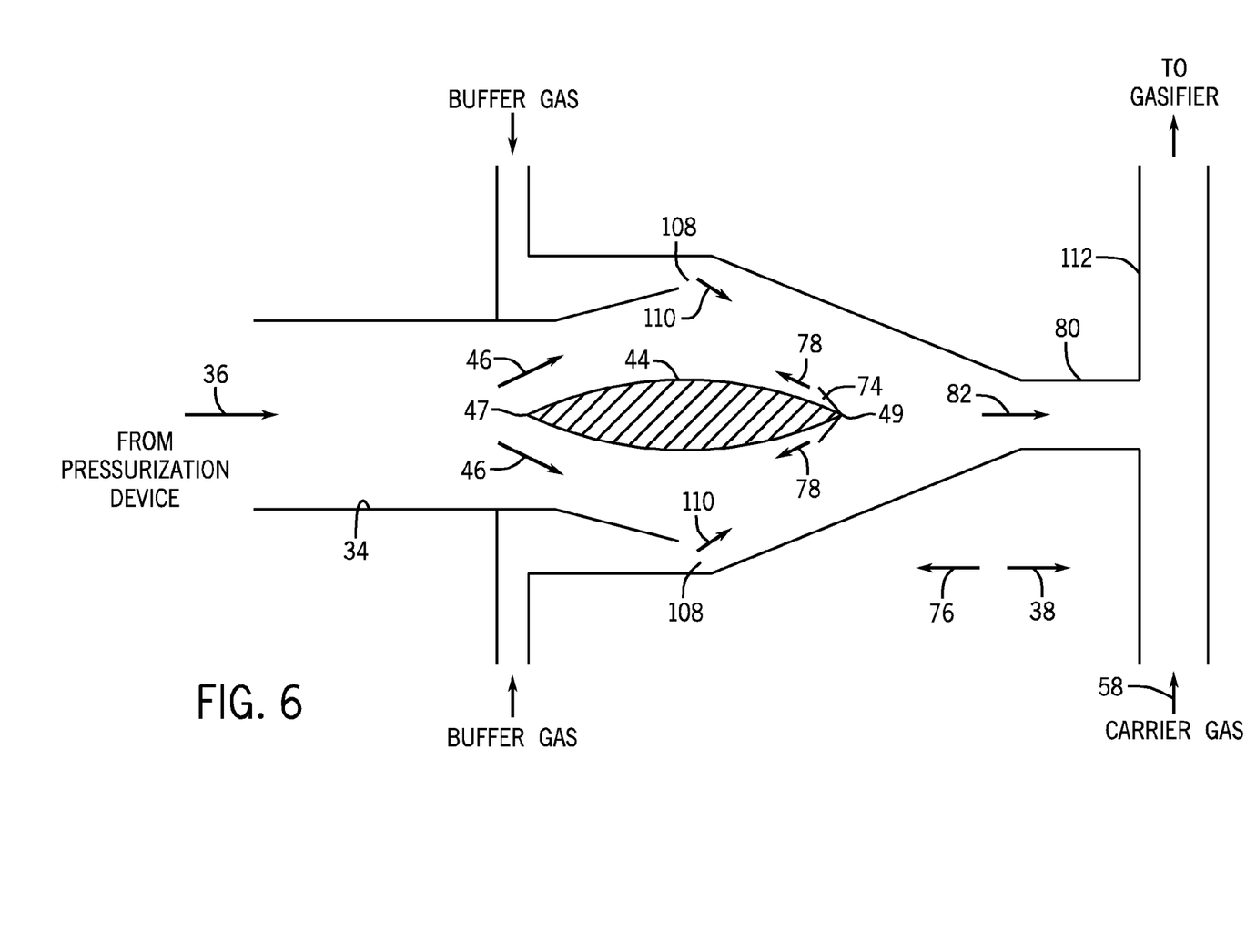
FIG. 6 is a schematic diagram of a further embodiment of the fluidization device including a carrier gas passage positioned downstream from a central mixing body.
Figure 7:
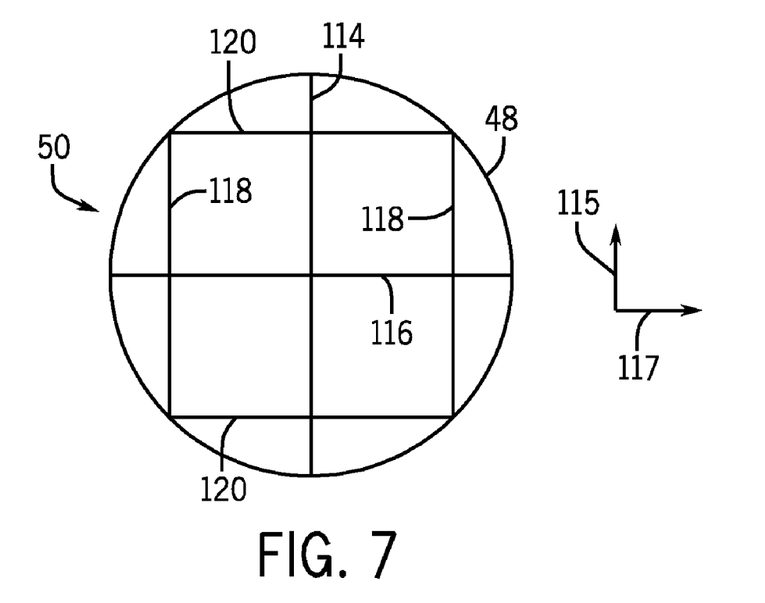
FIG. 7 is a front view of an embodiment of splitter vanes that may be employed within the fluidization device of FIG. 2.
Figure 8:
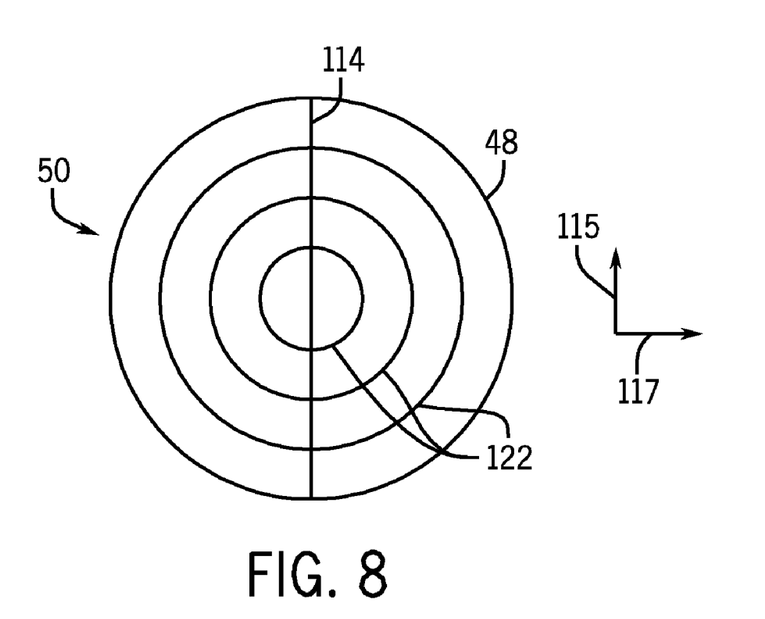
FIG. 8 is a front view of an alternative embodiment of splitter vanes that may be employed within the fluidization device of FIG. 2.

FIG. 5 is a schematic diagram of an alternative embodiment of the fluidization device 18 including downstream carrier gas injection ports. As illustrated, the buffer gas injection ports 100 are positioned further downstream compared to the ports 42 shown in FIG. 2. Specifically, the buffer gas injection ports 100 are located downstream from the leading edge 47 of the body 44, and configured to inject buffer gas in the downstream direction 38, as indicated by the arrows 102. As previously discussed, the body 44 is configured to break up agglomerations within the flow of solid particles 36. Consequently, by positioning the buffer gas injection ports 100 downstream from the leading edge 47 of the body 44, fewer agglomerations may contact the buffer gas injection ports 100, thereby reducing the possibility of particle accumulation within the ports 100.

Similar to the buffer gas injection ports 100, the carrier gas injection ports 104 are positioned further downstream compared to the ports 54 shown in FIG. 2. Specifically, the carrier gas injection ports 104 are located at the approximate axial position of the trim gas injection ports 74, and configured to inject carrier gas in the downstream direction 38, as indicated by the arrows 106. Because the body 44 and the flow of trim gas are configured to break up agglomerations and enhance homogeneity of particle distribution within the flow of solid 
particles 36, positioning the carrier gas injection ports 104 further downstream facilitates establishment of an even particle distribution prior to injection of carrier gas. In addition, certain carrier gases may be corrosive to elements within the pressurization device 16. Because the carrier gas is injected further downstream within the fluidization device 18, the possibility of carrier gas flowing into the pressurization device 16 is reduced, thereby substantially reducing or eliminating potential corrosive effects of the carrier gas.

While the illustrated embodiment omits the first and second sets of splitter vanes 50 and 62, it should be appreciated that alternative embodiments may include the first set of splitter vanes 50 and/or the second set of splitter vanes 62. Furthermore, while the illustrated embodiment omits the first and second sets of swirler vanes 52 and 64, it should be appreciated that alternative embodiments may include the first set of swirler vanes 52 and/or the second set of swirler vanes 64. In addition, while the illustrated embodiment includes the trim gas injection ports 74, it should be appreciated that alternative embodiments may omit the ports 74.

FIG. 6 is a schematic diagram of a further embodiment of the fluidization device 18 including a carrier gas passage positioned downstream from the body 44. Similar to the embodiment described above with reference to FIG. 5, the buffer gas injection ports 108 are positioned downstream from the leading edge 47 of the body 44, and configured to inject buffer gas in a downstream direction 38, as indicated by the arrows 110. However, the illustrated fluidization device 18 does not include carrier gas injection ports. Instead, the carrier gas is injected into a carrier gas passage 112 positioned downstream from the fluidization device 18. In this configuration, the agglomerations will be substantially broken up by the body 44, the trim gas and/or the buffer gas prior to the flow of solid particles 36 entering the carrier gas passage 112. Because the carrier gas is injected downstream of the fluidization device 18, the possibility of carrier gas flowing into the pressurization device 16 is reduced, thereby substantially reducing or eliminating potential corrosive effects of the carrier gas on elements of the pressurization device 16. Once the flow of solid particles 36 enters the carrier gas passage 112, the carrier gas will transport the solid particles 36 to the gasifier 20. In alternative embodiments, the fluidization device 18 may include additional carrier gas injection ports, similar to those described above with reference to FIG. 2 or FIG. 5, in addition to the carrier gas passage 112. Such embodiments may enhance the break up of agglomerations within the flow of solid particles 36 prior to the solid particles 36 entering the carrier gas passage 112.

While the illustrated embodiment omits the first and second sets of splitter vanes 50 and 62, it should be appreciated that alternative embodiments may include the first set of splitter vanes 50 and/or the second set of splitter vanes 62. Furthermore, while the illustrated embodiment omits the first and second sets of swirler vanes 52 and 64, it should be appreciated that alternative embodiments may include the first set of swirler vanes 52 and/or the second set of swirler vanes 64. In addition, while the illustrated embodiment includes the trim gas injection ports 74, it should be appreciated that alternative embodiments may omit the ports 74.

FIG. 7 is a front view of an embodiment of splitter vanes 50 that may be employed within the fluidization device of FIG. 2. As previously discussed, the fluidization device 18 may include a first set of splitter vanes 50 within the flow passage 34 and a second set of splitter vanes 62 within the carrier gas flow path 60. The splitter vanes 50 and 62 serve to support the body 44 and enhance fragmentation within the flow of solid particles 36. While the first set of splitter vanes 50 is shown in FIG. 7, it should be appreciated that the vanes may extend radially outward to form the second set of splitter vanes 62.

The illustrated splitter vane configuration includes a central vertical vane 114 extending outward along a vertical radial direction 115, and a central horizontal vane 116 extending outward along a horizontal radial direction 117. As will be appreciated, the central vertical and horizontal vanes 114 and 116 may be connected to the body 44, thereby supporting the body 44 during operation of the fluidization device 18. The illustrated configuration also includes two secondary vertical vanes 118 positioned radially outward from the central vertical vane 114, and two secondary horizontal vanes 120 positioned radially outward from the central horizontal vane 116. Alternative embodiments may employ more or fewer secondary vanes 118 and/or 120. For example, certain embodiments, may employ 1, 2, 3, 4, 5, 6, 7, 8, or more secondary vertical vanes 118 and/or secondary horizontal vanes 116. As previously discussed, the angle 51, 55 and 59 of each vane 114, 116, 118 and/or 120 may be adjustable relative to the flow of solid particles 36 to vary the degree of particle fragmentation.

FIG. 8 is a front view of an alternative embodiment of splitter vanes 50 that may be employed within the fluidization device of FIG. 2. The illustrated vane configuration includes the central vertical vane 114, as described above with reference to FIG. 7, and a series of concentric circular vanes 122 space along the radial directions 115 and 117. While three circular vanes 122 are employed within the illustrated embodiment, it should be appreciated that more or fewer circular vanes 122 may be utilized within alternative embodiments. For example, certain embodiments may include 1, 2, 3, 4, 5, 6, 7, 8, or more circular vanes 122. In addition, further embodiments may include a combination of circular vanes 122 and secondary vertical and/or secondary horizontal vanes 118 and/or 120. Further embodiments may also include a central horizontal vane 116. Similar to the vane configuration described above with reference to FIG. 7, the angle 51, 55 and 59 of the circular vanes 122 may be adjusted relative to the flow of solid particles 36. Furthermore, the circular vanes 122 may extend radially outward to form elements of the second set of splitter vanes 62.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:

a fluidization device comprising:

a flow passage configured to convey a flow of solid fuel particles in a downstream direction;

a body disposed within the flow passage, wherein the body is configured to direct the flow of solid fuel particles between the body and an outer wall of the flow passage; and a carrier gas injection port positioned radially outward from the body, wherein the carrier gas injection port is configured to provide a flow of carrier gas in the downstream direction to break up agglomerations within the flow of solid fuel particles;

wherein a shape of the body, a flow rate of carrier gas through the carrier gas injection port, or a combination thereof, is adjustable to vary an interaction between the flow of carrier gas and the flow of solid fuel particles.

2. The system of claim 1, comprising a trim gas injection port positioned downstream from the carrier gas injection port, wherein the trim gas injection port is configured to provide a flow of trim gas in an upstream direction to enhance mixing between the flow of carrier gas and the flow of solid fuel particles.

3. The system of claim 2, wherein the trim gas injection port is positioned adjacent to a downstream end of the body, and the trim gas injection port is configured to provide the flow of trim gas along a surface of the body.

4. The system of claim 1, comprising a plurality of splitter vanes disposed within the flow passage, wherein the plurality of splitter vanes are configured to enhance fragmentation within the flow of solid fuel particles.

5. The system of claim 1, comprising a first plurality of swirler vanes disposed within the flow passage, a second plurality of swirler vanes disposed within a flow path extending to the carrier gas injection port, or a combination thereof, wherein the first plurality of swirler vanes, the second plurality of swirler vanes, or a combination therefore, is configured to establish a recirculating or swirling flow of solid fuel particles.

6. The system of claim 1, comprising a shroud disposed within the flow passage, wherein the shroud defines a flow path extending to the carrier gas injection port, and the carrier gas injection port is formed at an axial end of the shroud.

7. The system of claim 6, wherein the shroud is oriented to decrease a cross-sectional area of the flow path extending to the carrier gas injection port along the downstream direction, the axial end of the shroud is tapered to establish a recirculating or swirling flow of carrier gas from the carrier gas injection port, or a combination thereof.

8. The system of claim 1, comprising a gasifier configured to receive the flow of solid fuel particles from the fluidization device.

9. The system of claim 1, wherein the carrier gas injection port is positioned adjacent to the outer wall of the flow passage.

10. The system of claim 1, wherein the shape of the body is adjustable to vary the interaction between the flow of carrier gas and the flow of solid fuel particles.

11. The system of claim 1, wherein the flow rate of carrier gas through the carrier gas injection port is adjustable to vary the interaction between the flow of carrier gas and the flow of solid fuel particles.

12. The system of claim 1, wherein the shape of the body and the flow rate of carrier gas through the carrier gas injection port are adjustable to vary the interaction between the flow of carrier gas and the flow of solid fuel particles.

13 passage, between the carrier gas and a pressurization device, or a combination thereof.

23. The system of claim 22, comprising a trim gas injection port positioned downstream from the carrier gas injection port, wherein the trim gas injection port is configured to provide a flow of trim gas in an upstream direction to enhance mixing between the flow of carrier gas and the flow of solid fuel particles.

24. The system of claim 22, comprising a plurality of splitter vanes disposed within the flow passage and configured to enhance fragmentation within the flow of solid fuel particles, a plurality of swirler vanes disposed within the flow passage and configured to establish a recirculating or swirling flow of solid fuel particles, or a combination thereof.

25. The system of claim 22, comprising a shroud disposed within the flow passage, wherein the shroud defines a flow path extending to the carrier gas injection port, and the carrier gas injection port is formed at an axial end of the shroud.

26. A system comprising:
a fluidization device comprising:
a flow passage configured to convey a flow of solid fuel particles in a downstream direction;
a body disposed within the flow passage, wherein the body is configured to direct the flow of solid fuel particles between the body and an outer wall of the flow passage; and
a plurality of splitter vanes disposed within the flow passage and configured to enhance fragmentation within the flow of solid fuel particles, a plurality of swirler vanes disposed within the flow passage and configured to establish a recirculating or swirling flow of solid fuel particles, or a combination thereof;
wherein a shape of the body, an angle of each splitter vane relative to the flow of solid fuel particles, an angle of each swirler vane relative to the flow of solid fuel particles, or a combination thereof, is adjustable.

27. The system of claim 26, comprising a carrier gas injection port configured to provide a flow of carrier gas in the downstream direction to break up agglomerations within the flow of solid fuel particles, a trim gas injection port configured to provide a flow of trim gas in an upstream direction to enhance homogeneity of particle distribution within the flow of solid fuel particles, or a combination thereof.

* * * * *